United States Patent [19]

Alligood

[11] Patent Number: 4,949,111
[45] Date of Patent: Aug. 14, 1990

[54] CAMERA HAVING FILM-DRIVEN MOTION TRANSMITTING MECHANISM

[75] Inventor: John H. Alligood, Penfield, N.Y.

[73] Assignee: Eastman Kodak Company, Rochester, N.Y.

[21] Appl. No.: 405,257

[22] Filed: Sep. 11, 1989

[51] Int. Cl.$^5$ .............................................. G03B 1/00
[52] U.S. Cl. .................................................... 354/213
[58] Field of Search ............ 354/170, 171, 172, 173.1, 354/212, 213, 214, 215, 216, 217, 218

[56] References Cited

U.S. PATENT DOCUMENTS

| | | | |
|---|---|---|---|
| Re. 32,558 | 12/1987 | Chan | 354/173.1 |
| 842,825 | 1/1907 | Bornmann | 242/71.3 |
| 2,906,184 | 9/1959 | Hennig et al. | 354/214 |
| 4,324,469 | 4/1982 | Harvey | 354/214 |
| 4,332,449 | 6/1982 | Zawodny et al. | 354/214 |
| 4,416,525 | 11/1983 | Chan | 354/173.1 |
| 4,441,799 | 4/1984 | Enonoto | 354/195.1 X |
| 4,457,605 | 7/1984 | Yamamoto | 354/173.11 |
| 4,619,509 | 10/1986 | Aoshima et al. | 354/173.1 |

FOREIGN PATENT DOCUMENTS 56-10626  3/1956  Japan .

Primary Examiner—Brian W. Brown
Attorney, Agent, or Firm—Roger A. Fields

[57] ABSTRACT

A photographic camera wherein a film metering sprocket undergoes respective cylces of rotation in each of two opposite directions when a filmstrip is advanced substantially a frame increment in reverse directions over the metering sprocket, and an operating element is actuated to perform a camera function when the metering sprocket is rotated a cycle in one of the opposite directions but is not actuated for such purpose when the metering sprocket is rotated a cycle in the other direction, is characterized in that the metering sprocket and the operating element are disposed in a coaxial relation and include one-way motion transmitting means which when the metering sprocket is rotated a cycle in the one direction engages to compel the metering sprocket to rotate the operating element continuously in the same direction but which when the metering sprocket is rotated a cycle in the other direction does not engage in order to permit the metering sprocket to rotate independently of the operating element.

7 Claims, 6 Drawing Sheets 4,949,111

CAMERA HAVING FILM-DRIVEN MOTION TRANSMITTING MECHANISM

BACKGROUND OF THE INVENTION

1. Field of the Invention

The invention relates generally to the field of photography, and in particular to cameras.

2. Description of the Prior Art

Typically in a number of relatively inexpensive 35 mm still-picture cameras, a film take-up drum or spool is manually rotated after each exposure to advance successive frames (imaging areas) of the filmstrip from a light-tight cartridge across the focal plane of a taking lens and onto the take-up drum. Each time the take-up drum is manually rotated, an unexposed frame of the filmstrip is positioned in the focal plane of the taking lens and an exposed frame is wound onto the take-up drum. At the same time, a metering sprocket in engagement with successive perforations in the filmstrip is rotated a single 360° revolution by advancement of the filmstrip substantially a frame increment. When the metering sprocket completes its 360° revolution, the sprocket is temporarily locked in place. Preferably, the take-up drum is similarly locked. After each exposure, the metering sprocket and the take-up drum are unlocked to allow film movement to be resumed in order to wind the exposed frame onto the take-up drum and to position another frame in the focal plane of the taking lens.

To rewind the filmstrip from the take-up drum back into the light-tight cartridge once all of the available frames have been exposed, a rewind knob in engagement with the film spool inside the cartridge is manually rotated to, in turn, rotate the film spool to take-up the filmstrip. During film rewind, the metering sprocket is rotated by the filmstrip in a direction opposite to the one it was rotated when the filmstrip was wound onto the take-up drum, and the locking mechanism for locking the sprocket and the drum in place is disabled.

Often, an operating element of the camera is actuated to perform a function, such as cocking a shutter or cocking a high energy member, when the metering sprocket is rotated in the direction attendant with film movement onto the take-up drum. Conversely, the operating element is not actuated for such purpose when the metering sprocket is rotated in the direction attendant with film movement back into the light-tight cartridge. Generally speaking, the prior art designs linking the operating element and the metering sprocket stand in need of simplification.

SUMMARY OF THE INVENTION

According to the invention, there is provided a photographic camera wherein a film metering sprocket undergoes respective cycles of rotation in each of two opposite directions when a filmstrip is advanced substantially a frame increment in corresponding directions over the metering sprocket, and an operating element is actuated to perform a camera function when the metering sprocket is rotated a cycle in one of the opposite directions but is not actuated for such purpose when the metering sProcket is rotated a cycle in the other direction, characterized in that:

said metering sprocket and said operating element are disposed in a coaxial relation and include one-way motion transmitting means which when the metering sprocket is rotated a cycle in the one direction engages to compel the metering sprocket to rotate the operating element continuously in the same direction but which when the metering sprocket is rotated a cycle in the other direction does not engage to permit the metering sprocket to rotate independently of the operating element.

More particularly, there is provided a photographic camera wherein a film metering sprocket undergoes respective cycles of rotation in each of two opposite directions when a filmstrip is advanced substantially a frame increment in corresponding directions over the metering sprocket, and an operating element is actuated to perform a camera function when the metering sprocket is rotated a cycle in one of the opposite directions but is not actuated for such purpose when the metering sprocket is rotated a cycle in the other direction, characterized in that:

said operating element includes a longitudinally split shaft which may be transversely compressed to reduce its width, and said metering sprocket includes tooth-like means which when the metering sprocket is rotated a cycle in the one direction engages the split shaft to compel the metering sprocket to rotate the operating element in the same direction but which when the metering sprocket is rotated a cycle in the other direction transversely compresses the split shaft to avoid engaging the shaft to permit the metering sprocket to rotate independently of the operating element.

DETAILED DESCRIPTION OF THE PREFERRED EMBODIMENT

The invention is disclosed as being embodied preferably in a 35 mm still-picture camera. Because the features of this type of camera is generally well known, the description which follows is directed in particular to photographic elements forming part of or cooperating directly with the disclosed embodiment. It is understood, however, that other elements not specifically shown or described may take various forms known to persons of ordinary skill in the art.

Figure 3:
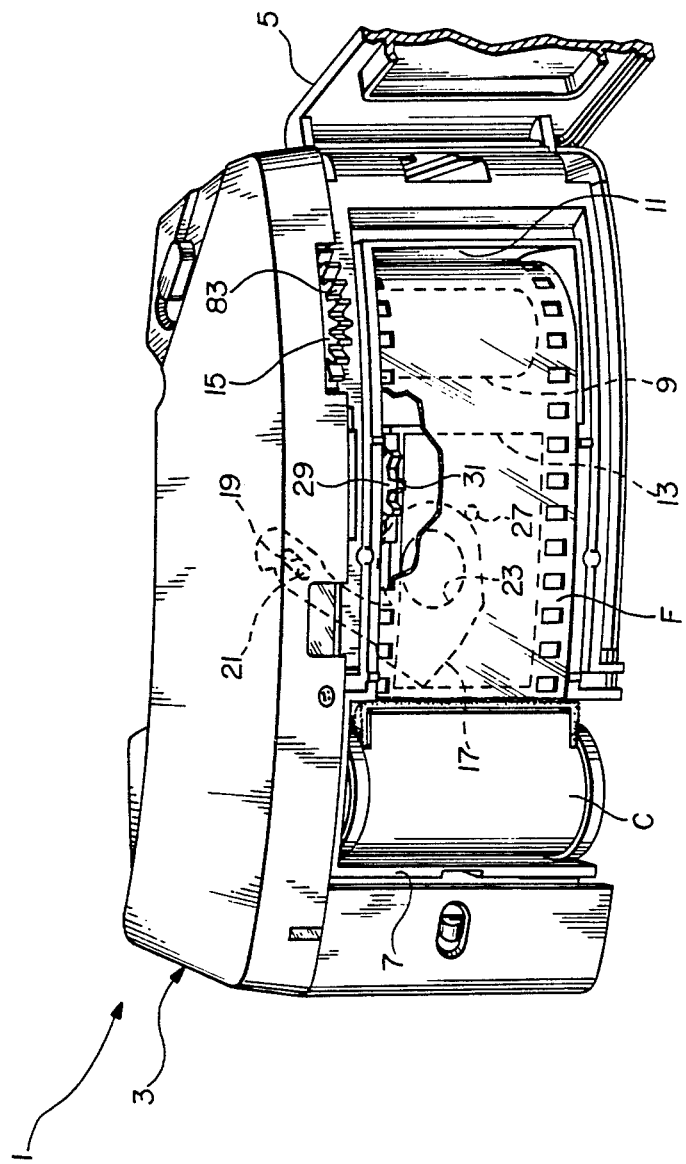
FIG. 3 is a rear perspective view of the camera housing, shown with a rear door of the housing open.

Referring now to the drawings, and in particular to FIG. 3, a 35 mm still-picture camera 1 is shown having a housing 3 including a back door 5 opened to reveal a conventional 35 mm film cartridge C situated within a loading chamber 7 of the housing. A take-up drum 9 located in a take-up chamber 11 of the housing 3 is manually rotated following each exposure of the filmstrip F at a rectangular-shaped window 13, to wind an exposed frame of the filmstrip onto the drum and to advance an unexposed frame of the filmstrip from the cartridge to the window.

Figure 1:
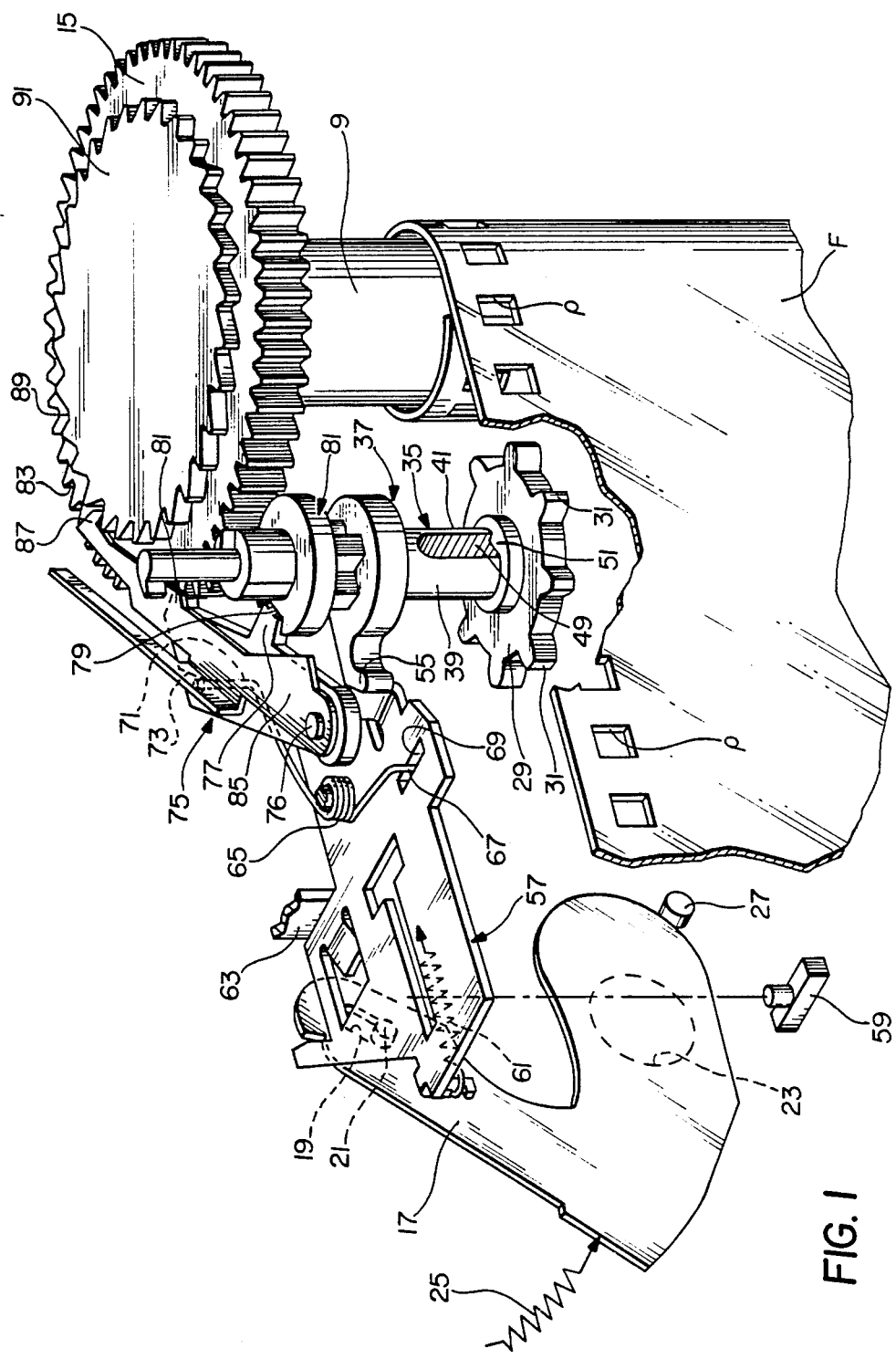
FIGS. 1 and 2 are perspective views of 35 mm camera apparatus including a film-driven motion transmitting mechanism according to a preferred embodiment of the invention, showing the camera apparatus in respective stages of operation.

As shown in FIG. 1, a thumbwheel 15 is coaxially secured to the take-up drum 9 to enable the drum to be manually rotated from outside the housing 3. The thumbwheel 15 is rotated counter-clockwise in FIG. 1 to similarly rotate the take-up drum 9, to wind the filmstrip F onto the drum. A conventional single blade shutter 17 includes a slot 19 through which a fixed pivot post 21 extends to support the shutter blade for pivotal movement about the post between an illustrated closed position covering a lens opening 23 and an unillustrated open position not covering the lens opening. When the lens opening 23 is uncovered, the film frame located at the window 13 is exposed. A schematically shown return spring 25 biases the shutter blade 17 normally against a fixed stop 27 to its closed position.

Figure 4:
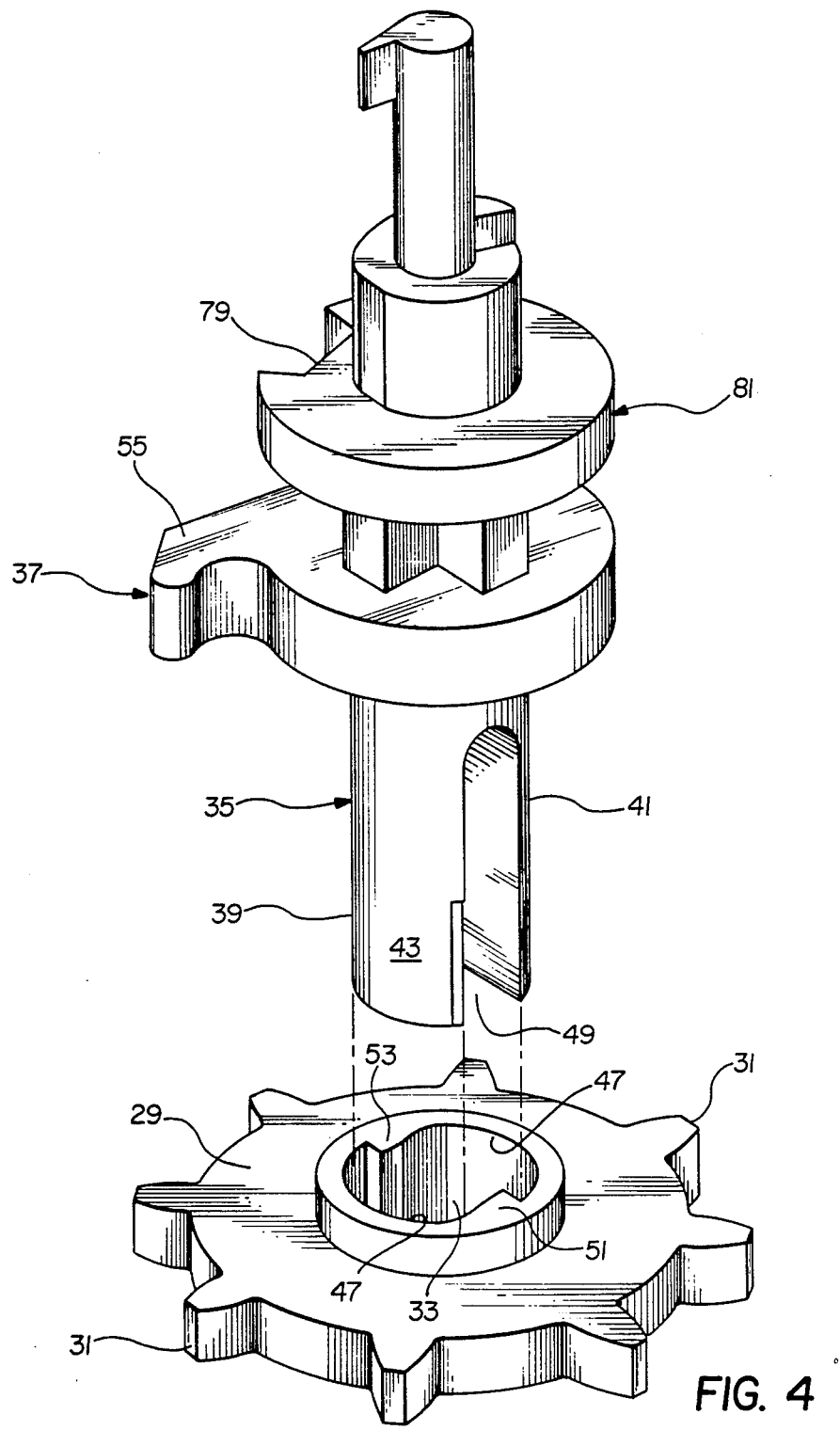
FIG. 4 is an exploded perspective view of the motion transmitting mechanism.
Figure 5:
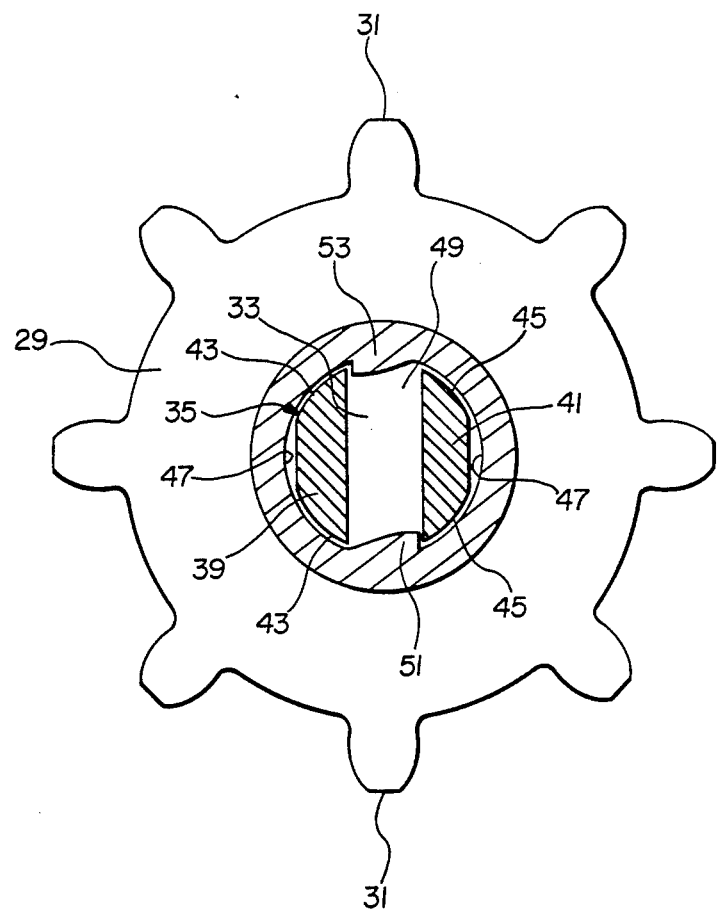
FIGS. 5 and 6 are partial sectional views of the motion transmitting mechanism, showing the mechanism in motion transmitting and non-motion transmitting states.
Figure 6:
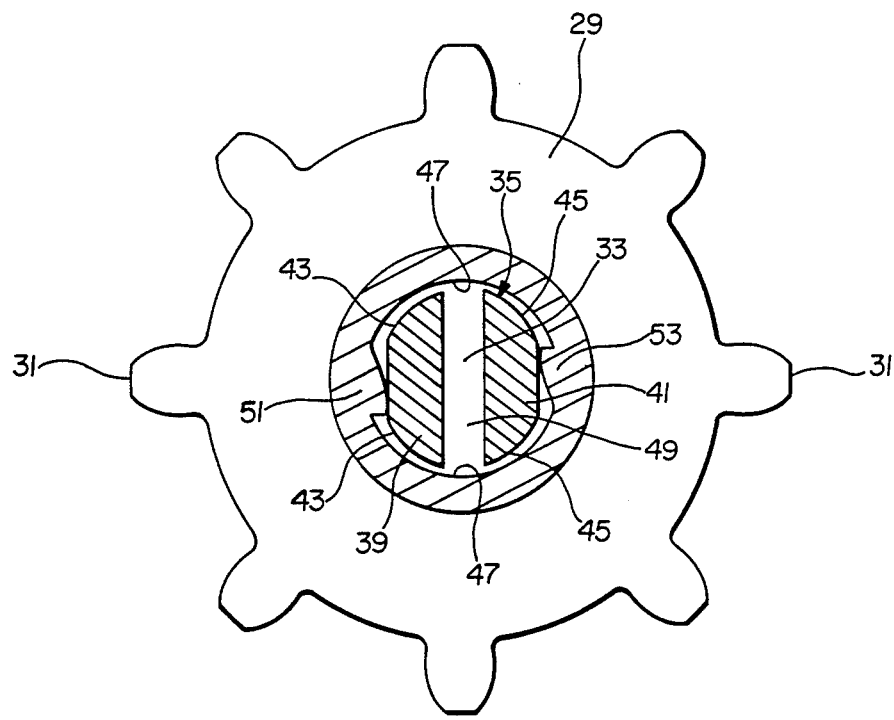

A metering sprocket 29 has respective evenly spaced peripheral teeth 31 for engaging the filmstrip F at its successive perforations P during film movement. As shown in FIGS. 4-6, the metering sprocket 29 has a central circular opening 33 in which is fitted a longitudinally split shaft 35 of an operating element 37. The split shaft 35 comprises a pair of substantially parallel, identical leg members 39 and 41 having respective peripheral curved surface portions 43 and 45 shaped substantially in conformity with the peripheral edge 47 of the sprocket opening 33. The two leg members 39 and 41 may be transversely flexed towards one another to at least partially occupy a space 49 normally separating the leg members. See FIG. 6. A pair of opposite, identical ramp-like teeth 51 and 53 of the metering sprocket 29 are normally disposed in the space 49 between the leg members 39 and 41 to engage the leg members when the metering sprocket is rotated counter-clockwise in FIGS. 4 and 5, to compel the metering sprocket to similarly rotate the operating element 37. Conversely, when the metering sprocket 29 is rotated clockwise in FIGS. 4 and 5, the ramp-like teeth 51 and 53 can move out of the space 49 between the leg members 39 and 41 to flex the leg members towards one another to avoid engaging them, to permit the metering sprocket to rotate clockwise without having to similarly rotate the operating element 37. See FIG. 6.

Figure 2:
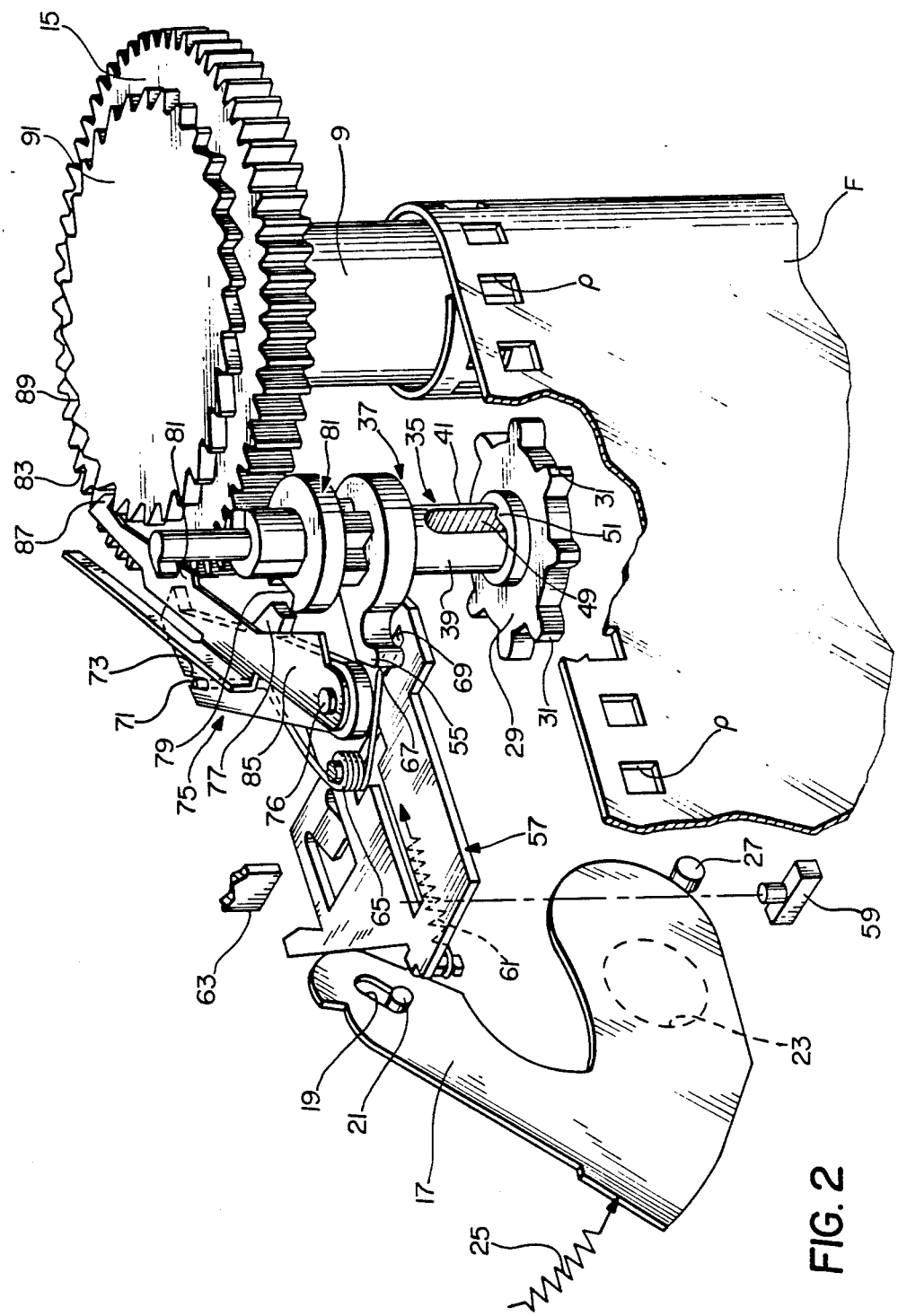

As shown in FIGS. 1 and 2, a cam member 55 is coaxially secured to the operating element 37 to shift a high energy slide 57 to the left in FIG. 2 from its illustrated uncocked position to a cocked position illustrated in FIG. 1, when the operating element is rotated counter-clockwise in FIG. 2 by the metering sprocket 29. A fixed support/stop 59 for the high energy slide 57 holds the slide in its uncocked position in FIG. 2 against the minor force of a schematically shown actuating spring 61, which is then relaxed, and a known shutter release extension 63 holds the slide in its cocked position in FIG. 1 against the major force of the actuating spring, which is then tensioned. If the shutter release extension 63 is removed from the high energy slide 57, for example in response to manually depressing a shutter release button (not shown) atop the housing 3, the actuating spring 61 will rapidly shift the slide from its cocked position in FIG. 1 to its uncocked position in FIG. 2, pivoting the shutter blade 17 clockwise in FIG. 1 about the pivot post 21 from its illustrated closed position to its unillustrated open position to momentarily uncover the lens opening 23. Simultaneously, a wire spring 65 having one end portion 67 in a slot 69 in the high energy slide 57 and another end portion 71 in a slot 73 in a metering lever 75 is actuated to pivot the metering lever 75 counter-clockwise in FIG. 1 about a fixed pivot post 76 from its illustrated metering position to a non-metering position illustrated in FIG. 2. In the metering position, a locking pawl 77 of the metering lever 75 is located in a gap 79 in an annular metering collar 81 of the operating element 37 to temporarily lock the operating element in place, to prevent rotation of the metering sprocket 29 counter-clockwise in FIG. 1, and an anti-backup pawl 81 of the metering lever engages the toothed periphery 83 of the thumbwheel 15 to prevent rotation of the thumbwheel counter-clockwise in FIG. 1, to prevent similar rotation of the take-up drum 9. In the non-metering position, the locking pawl 77 is removed from the gap 77 to unlock the operating element 37, to allow rotation of the metering sprocket counter-clockwise in FIG. 2, and the anti-backup pawl 81 is removed from the toothed periphery 83 to allow the thumbwheel 15 and thus the take-up drum 9 to be rotated counter-clockwise in FIG. 2.

As shown in FIG. 1, a conventional anti-backup lever 85 includes an anti-backup pawl 87 normally engaging the toothed periphery 89 of a disk member 91 coaxially secured to the thumbwheel 15. As is known, this is to prevent rotation of the thumbwheel 15 and thus the take-up drum 9 clockwise in FIG. 1 (to prevent the filmstrip F from unwinding off the drum).

OPERATION

Beginning with FIG. 1, when the shutter release extension 63 is removed from the high energy slide 57, the actuating spring 61 shifts the slide to the right in FIG. 1 from its cocked position to its uncocked position in FIG. 2, pivoting the shutter blade 17 clockwise in FIG. 1 from its closed position to its (unillustrated) open position to momentarily uncover the lens opening 23, to expose the film frame located at the window 13 in FIG. 1. The return spring 25 returns the shutter blade 17 to its closed position once the high energy slide 57 is moved clear of the shutter blade. Movement of the high energy slide 57 to its uncocked position in FIG. 2 induces the wire spring 65 to pivot the metering lever 75 counter-clockwise in FIG. 1 from its metering position to its non-metering position in FIG. 2, to disengage from the operating element 37 and the thumbwheel 15.

When the thumbwheel 15 is then manually rotated counter-clockwise in FIG. 2, the take-up drum 9 is similarly rotated to wind the exposed frame onto the drum and to position an unexposed frame at the window 13. Such film movement substantially a frame increment, which is to the right in FIG. 2, rotates the metering sprocket 29 counter-clockwise 360° in FIG. 2 to compel the metering sprocket via its ramp-like teeth 51 and 53 to similarly rotate the operating element 37. As a result, the cam member 55 swings counter-clockwise in FIG. 2 to return the high energy slide 57 to its cocked position in FIG. 1, where the slide is trapped in that position by the shutter release extension 63. When the cam member 55 moves clear of the high energy slide 57, the metering lever 75 re-engages the operating element 37 and the thumbwheel 15.

After all of the available frames have been exposed, it is necessary to rewind the filmstrip F from the take-up drum 9 back into the cartridge C. Thus, a conventional rewind button (not shown) at the exterior of the housing 3 is manually depressed to pivot the anti-backup lever 31 counter-clockwise in FIG. 1 to disengage its anti-backup pawl 87 from the toothed periphery 89 of the disk member 91. This allows the take-up drum 9 to be rotated clockwise in FIG. 1 to permit the filmstrip F to be unwound off the drum. A conventional rewind knob (not shown) in engagement with the film spool inside the cartridge C is manually rotated to, in turn, rotate the film spool to take-up the filmstrip F. During film rewind, the metering sprocket 29 is rotated by the filmstrip F in a direction (clockwise in FIG. 1) opposite to the one it was rotated when the filmstrip was wound onto the drum 9. However, the locking pawl 77 of the metering lever 75 remains substantially in the gap 79 in the metering collar 81 of the operating element 37 to continue to lock the operating element in place. As a result, the ramp-like teeth 51 and 53 of the metering sprocket 29 move out of the space 49 between the leg members 39 and 41 of the operating element 37 to flex the leg members towards one another to avoid engaging them, thereby permitting the metering sprocket to be rotated clockwise in FIG. 1 without having to similarly rotate the operating element. See FIG. 6.

The invention has been described with reference to a preferred embodiment. However, it will be appreciated that variations and modifications can be effected within the ordinary skill in the art without departing from the scope of the invention.

I claim:

1. A photographic camera wherein a film metering sprocket undergoes respective cycles of rotation in each of two opposite directions when a filmstrip is advanced substantially a frame increment in corresponding directions over said metering sprocket, and an operating element is actuated to perform a camera function when said metering sprocket is rotated a cycle in one of the opposite directions but is not actuated for such purpose when the metering sprocket is rotated a cycle in the other direction, characterized in that:

said operating element includes a split shaft comprising a pair of substantially parallel leg members which may be transversely flexed towards one another to at least partially occupy a space normally separating said leg members, and said metering sprocket includes a pair of ramp-like teeth normally disposed in the space between said leg members which remain in the space to engage the leg members when the metering sprocket is rotated a cycle in the one direction and which move out of the space to flex the leg members towards one another to avoid engaging them when the metering sprocket is rotated a cycle in the other direction.

2. A photographic camera as recited in claim 1, wherein said leg members are integrally formed with said operating member and said ramp-like teeth are integrally formed with said metering sprocket.

3. A photographic camera as recited in claim 1, wherein said metering sprocket has a central circular opening, said leg members of said operating element extend into said central opening and have respective peripheral surface portions shaped substantially in conformity with the peripheral edge of said central opening, and said ramp-like teeth of the metering sprocket protrude into said central opening at the space between said leg members.

4. A photographic camera as recited in claim 1, wherein said operating element includes respective means for performing shutter related and film metering related functions when the operating element is rotated in the one direction by said metering sprocket.

5. A photographic camera wherein a film metering sprocket undergoes respective cycles of rotation in each of two opposite directions when a filmstrip is advanced substantially a frame increment in corresponding directions over said metering sprocket, and an operating element is actuated to perform a camera function when said metering sprocket is rotated a cycle in one of the opposite directions but is not actuated for such purpose when the metering sprocket is rotated a cycle in the other direction, characterized in that:

said operating element includes a longitudinally split shaft which may be transversely compressed to reduce its width, and said metering sprocket includes tooth-like means which when the metering sprocket is rotated a cycle in the one direction engages said split shaft to compel the metering sprocket to rotate said operating element in the same direction but which when the metering sprocket is rotated a cycle in the other direction transversely compresses the split shaft to avoid engaging the shaft to permit the metering sprocket to rotate independently of the operating element.

6. A photographic camera as recited in claim 5, wherein said metering sprocket has a central opening, and said split shaft of the operating element extends into said central opening to coaxially dispose said metering sprocket and said operating element.

7. A photographic camera as recited in claim 6, wherein said operating element is a single unitary piece including respective coaxial means for performing shutter related and film metering related functions when the operating element is rotated in the one direction by said metering means.

* * * * *